H. HIGGIN.
PROCESS OF BRAZING TUBING.
APPLICATION FILED MAR. 14, 1910.
1,052,820.
Patented Feb. 11, 1913.
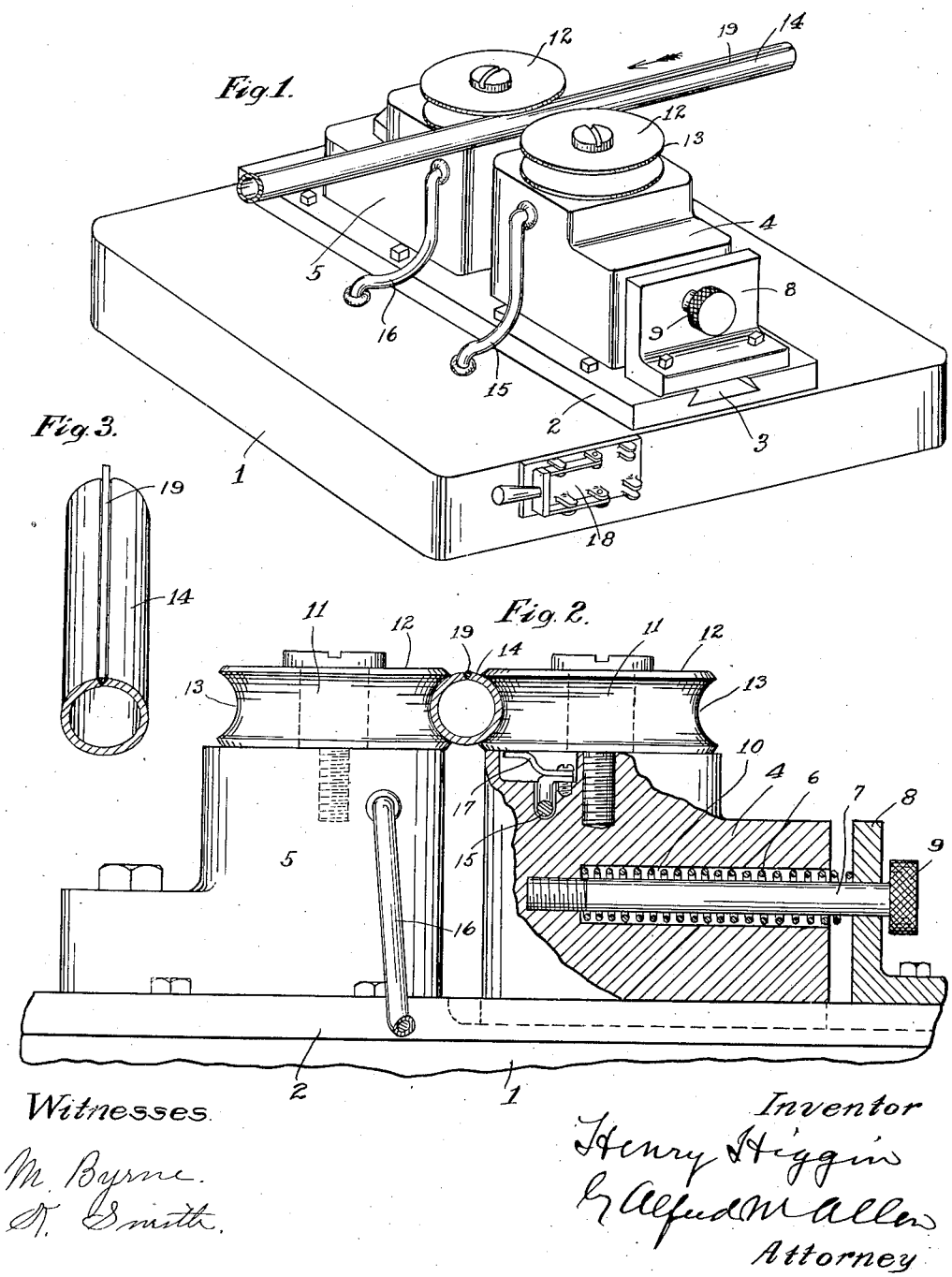

UNITED STATES PATENT OFFICE.

HENRY HIGGIN, OF NEWPORT, KENTUCKY, ASSIGNOR TO THE HIGGIN MANUFACTURING COMPANY, OF NEWPORT, KENTUCKY, A CORPORATION OF WEST VIRGINIA.

PROCESS OF BRAZING TUBING.

1,052,820.  Specification of Letters Patent.  Patented Feb. 11, 1913.

Application filed March 14, 1910. Serial No. 549,301.

*To all whom it may concern:*

Be it known that I, HENRY HIGGIN, a citizen of the United States, and a resident of the city of Newport, in the county of Campbell and State of Kentucky, have invented certain new and useful Improvements in Processes of Brazing Tubing, of which the following is a full, clear, and exact description, reference being had to the accompanying drawing, forming a part of this specification.

In the process of the manufacture of brass tubing and the like provided with a longitudinal seam, great difficulty is experienced and heavy loss incurred in soldering or brazing the seam so that there shall be no parting at the joint. Such seamed tubes are usually manufactured from sheets of brass or the like cut into strips of uniform width, to make a tube of the desired diameter, and the tube is formed by running the strip between dies graded in shape to gradually fold the strip into a tube. Tubing thus folded into cylindrical shape is very prone to show irregularity at the seam; the edges, in places, overlap, and at other places gap apart. Now when the unfinished tube is placed in the brazing furnace and heated to brazing temperature, with the tube supported only at the edge of the furnace and exposed to the heat, between bearings eighteen inches to twenty-four inches apart, as is usually the case, it is almost a matter of luck whether the brazed seam will hold, and the loss from defective joints is very large. I have discovered, however, that such tubing may be very successfully welded or brazed electrically, with a percentage of loss from open joints practically negligible, especially where the tubing has been accurately folded from the strip.

In the drawings I have illustrated suitable apparatus for carrying out my process.

Figure 1 is a perspective view of a brazing machine with the tubing in place. Fig. 2 is a front elevation partly in vertical section. Fig. 3 is a perspective view of a section of the tubing.

1 is the base plate of any convenient size and shape for holding the operative parts of the apparatus.

Bolted on the base is a plate 2 provided with a longitudinal dovetailed recess 3 in which is adjustably mounted the block 4. A corresponding block 5 is securely bolted in fixed position on the plate 2. The block 2 is provided with a socket 6 in which is mounted the pin 7, screw threaded in the block at the base of the socket. This pin passes through the stop plate 8 which is bolted on the plate 2 and the pin is provided with a knurled head 9, while a coiled spring 10 mounted on the pin 7 bears between the base of the socket 6 and the stop plate 8, so that normally the block 4 is under tension pressing it toward the fixed block 5. The head 9 of the pin 7, however, by contact with the stop plate 8 limits this tension.

Mounted on spindles 11, secured to the upper surface of the blocks 4 and 5, are the metallic rollers 12, 12, provided with corresponding grooves 13, 13, to fit around and properly embrace the tubing 14, whose edges are to be brazed, and it will be evident from the foregoing description that the edges of the tubing will be pressed and held uniformly together as the tubing is fed continuously between these rollers.

I have not illustrated any mechanism for feeding the tube continuously between the rollers, as the brazing apparatus may be attached to the machine for forming the tubes and the same mechanism employed to propel the blank through the tube forming machine may be used to propel the tube through the brazing apparatus; or the tubes after being formed and removed from the machine may be introduced into the brazing apparatus and drawn or pushed between the rollers by any of the well known appliances for that purpose.

15, 16 are the wires for conveying the electric current to the machine, and these wires are properly insulated and connected by any suitable connection as 17, with the rollers 12, 12, one wire to one roller and the other to the other roller.

18 is the switch for throwing on or off the current, which as usual in welding machines will be of great volume but of low voltage.

Before the tube is introduced between the rollers, a narrow strip of spelter solder 19 is introduced between the edges of the tube, or the tube may have the outer edges cut away at the joint to form a V-shaped cut in cross section. Where the V-shaped cut is provided instead of a spelter strip, grain spelter mixed with powdered flux and reduced to the consistency of a thick cream may be used, as is common practice in brazing tubes. The tube is then fed slowly between the rolls 12, 12, with the seam uppermost, the current is turned on and at the joint the temperature quickly rises to the brazing point, the spring pressure between the rolls presses the edges of the joint firmly together, and the tube is brazed or soldered with a perfect joint, not at all liable to open up, or become distorted.

What I claim as new, and of my invention and desire to secure by Letters Patent, is:—

1. The method of brazing tubing which consists in applying uniform lateral pressure around the tube on both sides of the seam by lateral pressure devices, simultaneously feeding forward the tube and passing an electric current from one lateral pressure device to the other of sufficient intensity to distribute the heat uniformly through the tube and to raise the temperature of the tube at the seam to the brazing temperature without melting the material of the tube.

2. The method of brazing tubing which consists in applying uniformly yielding lateral pressure around the tube on both sides of the seam by lateral pressure devices adapted to yield under inequalities of the tube without relieving the pressure, simultaneously feeding forward the tube and passing an electric current from one lateral pressure device to the other of sufficient intensity to distribute the heat uniformly through the tube and to raise the temperature of the tube at the seam to the brazing temperature without melting the material of the tube.

HENRY HIGGIN.

Witnesses:
 FRANK H. KUNKEL,
 K. SMITH.